United States Patent [19]

Turner

[11] 4,232,845
[45] Nov. 11, 1980

[54] ON-SITE MODULAR SUPPORT SYSTEMS FOR SUPPORTING CABLES, CONDUIT AND THE LIKE

[75] Inventor: Raymond Turner, Newcastle, Australia

[73] Assignee: Aquila Steel Company, Ltd., Sydney, Australia

[21] Appl. No.: 898,019

[22] Filed: Apr. 20, 1978

[51] Int. Cl.³ ............................ F16L 3/00; F16L 3/22; H02G 3/04

[52] U.S. Cl. ....................................... 248/49; 52/220; 52/696; 174/68 C; 174/101; 248/58; 248/65; 248/222.1; 248/558

[58] Field of Search ..................... 248/49, 58, 63, 65, 248/68 R, 73, 59, 222.1, 558; 403/242, 252, 254; 46/27, 28, 29; 182/821, 151, 222, 228; 220/3.92, 3.94; 193/38; 174/101, 68 C, 72 A, 72 R, 97; 52/696, 220; 238/339 R

[56] References Cited

U.S. PATENT DOCUMENTS

| | | | |
|---|---|---|---|
| 1,167,768 | 1/1916 | Lochner | 220/22 |
| 2,656,999 | 10/1953 | Ullberg, Jr. | 248/68 R |
| 2,980,376 | 4/1961 | Westerfield | 248/536 |
| 3,351,699 | 11/1967 | Merckle | 248/68 R X |
| 3,521,843 | 7/1970 | Ogle | 174/68 C |
| 3,791,613 | 2/1974 | Nollen | 248/68 R |
| 3,890,459 | 6/1975 | Caveney | 248/68 R |
| 4,098,481 | 7/1978 | Johnson et al. | 248/243 |
| 4,124,324 | 11/1978 | Augis | 52/220 |

FOREIGN PATENT DOCUMENTS

| | | | |
|---|---|---|---|
| 640484 | 5/1962 | Canada | 248/68 C |
| 2353471 | 11/1974 | Fed. Rep. of Germany | 248/49 |
| 1180388 | 12/1958 | France | 248/49 |
| 1227189 | 2/1960 | France | 248/49 |
| 1339214 | 8/1963 | France | 248/49 |
| 2226606 | 11/1974 | France | 248/49 |

Primary Examiner—James T. McCall
Attorney, Agent, or Firm—Robert J. Schaap

[57] ABSTRACT

Modular support systems constructed from a plurality of transportable modular components which are capable of being rapidly assembled and disassembled at an on-site location. The support systems are capable of being assembled into shelves, platforms, ladders, walkways, and like structures, and may be attached to existing structural members. The support systems are comprised of a plurality of rails and metal rungs for extension between and attachment to the rails in a variety of positions to form various structures. The rungs are provided on each of their opposite transverse ends with tabs capable of fitting through complementary slots in the rails. The tabs may be displaced so as to make the ends of the rungs captive in the rails. The modular support systems also include various other components such as vertical risers, 90° bends, tees, reducers, and the like. These various components may also be provided with the tabs and corresponding complementary slots for assembly and disassembly to form the various structural members. In addition, suspension rods are also provided for use with the various components to supportively suspend its various structural members. In the preferred aspect these support systems are used for holding and retaining electrical cables, conduit, and the like.

15 Claims, 26 Drawing Figures

ON-SITE MODULAR SUPPORT SYSTEMS FOR SUPPORTING CABLES, CONDUIT AND THE LIKE

BACKGROUND OF THE INVENTION

1. Purpose of the Invention

This invention relates in general to certain new and useful improvements in modular support systems capable of being assembled or disassembled at an on-site location, and, more particularly, modular support systems of the type stated which include a plurality of structural members connected by rungs in such manner that the structural members and rungs have cooperating attachment elements for removable attachment.

2. Brief Description of the Prior Art

There have been many forms of support systems capable of being constructed in the forms of shelves, ladders, and the like at various locations for the support of electrical cables, conduit and the like. These cable support systems, often referred to as cable ladders, are designed to hold extended lengths of cable, particularly electrical cable, when large bundles of these cables are required. Typically, these cable support systems or cable ladders are used in power stations, heavy industrial plants, commercial buildings, port installations, hospitals and the like, where distribution of power is required. Even more so, cable support systems of this type are used where a large number of cables carrying different electrical signals on a plurality of electrical cords are required for distribution to various points in a facility.

In many cases, these cable support systems are constructed in underground tunnels for carrying the electrical power from a power station, for example, to a facility of use, e.g., a port installation or the like. Generally, the cables are placed on these cable support systems or cable ladders in a position where ready access is available for purposes of maintenance, repair, or replacement.

Generally, all such forms of cable and conduit support systems of this type are usually of the permanent construction and must be assembled at an on-site location requiring considerable construction equipment and the like. Moreover, these conventional cable support systems are not readily adaptable for new design layout. Thus, in many of the commercially available cable support systems, these systems employ metal components which are connected together by welded construction or otherwise permanently attached to existing structural walls. Typically, these commercially available cable support systems require a large number of components of varying sizes and shapes. In many cases some components may be assembled by means of screws, bolts, and other forms of metal fasteners. However, these components generally are not modular and do not afford easy or convenient assembly in order to connect the components together with the necessary degree of structural integrity. Many of the portions or sub-structures of these cable ladders are typically not effective for on-site assembly and disassembly due to the significant amount of time and effort required in the assembly of such cable ladders.

Most of the presently available cable support systems which include some sub-structures which can be assembled at an on-site location do not include the necessary components in order to provide for directional change and to accommodate the load requirements at a particular location.

One of the principal design criteria with respect to these cable support systems is that the cables cannot be displaced at relatively sharp angles oftentimes due to the size of the cable bundle. Even more so, the conduits are of fairly rigid construction and cannot be displaced at relatively sharp angles. Thus, the cable support system must be designed and constructed so that the cables, conduit, and like components can be turned through a relatively wide angle, either in the horizontal direction or in the vertical direction.

The present invention overcomes these and other problems in the provision of a modular cable or conduit support system which includes a small number of components which are capable of being combined in a wide variety of positions and arrangements in order to provide the necessary versatility of the modular support system.

OBJECTS OF THE INVENTION

It is, therefore, the primary object of the present invention to provide a modular support system which can be easily assembled and disassembled at an on-site location and includes a plurality of rails capable of being connected by rungs in any of a number of pre-selected locations and in which the rungs have tabs extending through the rails capable of being displaced to make the rung ends captive in the rails.

It is another object of the present invention to provide a modular support system of the type stated in which both horizontal and vertical components can be constructed including shelves, ladders, and like components.

It is also an object of the present invention to provide a modular support system of the type stated which is uniquely adapted for the carrying of electrical cables, conduit, and similar items.

It is a further object of the present invention to provide a modular support system of the type stated in which various support areas may be located in varying directions through the provision of angle bends, tees, reducers, and the like.

It is an additional object of the present invention to provide a modular support system of the type stated in which the components are relatively light in weight but highly durable in their construction and which are easily assembled and disassembled.

It is another salient object of the present invention to provide a method of assembling and disassembling a support system at an on-site location and in which rails forming part of the support system can be easily connected in a plurality of desired positions by means of rungs having unique locking features on the rungs and cooperating locking features on the rails.

It is yet a further object of the present invention to provide a method of assembling a modular support system at an on-site location in which the components of the support system can be assembled in a number of arrangements and in a minimum amount of time and space.

With the above and other objects in view, my invention resides in the novel features of form, arrangement, and combination of parts presently described and pointed out in the claims.

SUMMARY OF THE DISCLOSURE

The present invention relates to a modular supporting system of the type uniquely adapted for carrying cables, such as electrical cables, conduits, both of the type carrying fluids and of the type carrying electrical cables, and like members. Conventional support systems of this type are typically referred to as cable ladders inasmuch as some of the sub-structure supports are constructed of pairs of longitudinally-extending spaced apart rails which are connected together by means of plates extending between the two rails. These plates are often spaced apart from each other and thereby adopt the appearance of rungs in a ladder.

As used herein, the term "cable" is used in its generic sense to encompass all forms of cable, as for example, electrical cable and other forms of cable which are not electrically conductive, but especially cables of the type which carry bundles of electrical cords. The term "conduit" is also used in its generic sense to encompass all forms of conduit, including pipes for carrying fluids such as gases or liquids, and especially conduit which carries electrical cables.

The modular support systems of the present invention are generally comprised of a plurality of rails such that they can be assembled in longitudinally-extending, spaced-apart relationship with a plurality of spaced-apart rungs extending therebetween. The rails are comprised of a flat structural wall with an outwardly projecting flange at the lower end thereof. In the assembled relationship, the flanges on each of a pair of spaced-apart rails will face each other. At the upper ends of the rails, the flat walls are provided with outwardly struck support flanges which extend in a direction opposite to the lower flanges and which are capable of retaining a cover member of a type hereinafter described.

Each of the rails are provided in the flat wall with a plurality of longitudinally-extending, spaced-apart slots which are adapted to receive tabs on the transverse ends of each of the rungs. Each of these tabs extend through the slots and are capable of being displaced for retentively locking the rungs to the pair of spaced-apart rails. Moreover, by the relative spacing of the slots, the number of rungs can be varied depending upon the load requirements. The tabs may be displaced by bending the same downwardly or upwardly. In this way, it is possible to easily remove the rungs by merely straightening the tab to its initial position to thereby facilitate removing the various rungs from the spaced-apart rails.

The rungs have a generally flat upper plate which is also provided with a series of longitudinal slots to enable U-bolts, or like fasteners, to be inserted therethrough for holding the cable or conduit against the various rungs. Moreover, the rungs are provided with downwardly struck legs which are capable of engaging the lower flanges on the rails such that the flanges on the rails provide additional support to the rungs.

The rails may be connected in endwise relationship by means of connector plates. In addition, the present invention includes a second form of connector plates which connect the rails at essentially a right angle to each other. Moreoever, a third form of connector plate connects the rails at a generally obtuse angle with respect to each other, namely, an angle greater than 90°.

The rails are provided with sets of apertures spaced along the flat wall thereof. Typically, a plurality of these sets of apertures are provided and each set is generally comprised of two apertures. Moreover, each of the connecting plates have structural walls with apertures capable of being aligned with the apertures in the rails. In this way, the uniformity of the spacing and the sizing of the apertures permits the various connecting plates to be used with the rails and to be secured to the rails with conventional fasteners, such as screws, bolts or the like.

The cover plate mentioned above is often disposed over the rails so as to provide a protective environment for the cable or conduit which is carried on the cable ladders or platforms thus formed by the rails and the rungs. The cover plates have flanges at each of the longitudinal margins thereof which extend over the upper flanges on the rails. In this way, the cables or conduit are shielded from water, dirt, or other undesirable environmental aspects.

The present invention also comprises a plurality of springs clamps which are uniquely sized and shaped so as to engage upwardly extending protrusions on the cover plates. Moreover, the clamps are provided with a pair of spaced-apart fingers which are sized and shaped so as to extend through the sets of apertures in the rails or in the connecting plates.

The present invention also comprises a plurality of support columns. In a first embodiment of the support colums, these columns are generally formed of a pair of spaced-apart walls connected together by means of a relatively flat connecting wall such that they adopt a generally U-shaped construction. The flat connecting wall is also provided with a plurality of slots and a plurality of apertures for receiving tabs or otherwise fasteners in the apertures.

In one embodiment of the invention, two such U-shaped support columns may be connected together by means of fasteners extending through the apertures. The columns are capable of being supported in an upright position by means of floor pads or so-called "anchor pads" which are capable of being anchored to the floor by means of conventional anchors. In another embodiment of the invention, the support column is similar to the first-described column except that it includes a pair of outwardly extending flanges on the free ends of the two spaced-apart plates. The flanges in this case will carry the fastener-receiving apertures for securement to an existing structural wall or similar existing structural surface. This latter form of support rail does not necessarily require the use of the anchor pads.

Either of the support columns are capable of retaining outwardly-extending support brackets. These support brackets generally include a relatively flat support plate also having a plurality of slots therein. Moreover, the support plate is provided with a pair of spaced-apart, longitudinally-extending, and downwardly-struck walls. At one end thereof, these walls are integrally provided with outwardly struck tabs having recessed portions therein for extension into and engagement in the slots of the support rails. Thus, a plurality of these outwardly-struck support brackets are capable of supportively retaining a plurality of the spaced-apart rails on the upper flat plates thereof. Moreover, the slots in the upper plate permit securement by means of metal fasteners to the rungs which are connected to the pair of spaced-apart rails supported thereon. In this respect, it should be observed that the upper plates of the rungs and the flat support plates of the support brackets could be provided with the sets of apertures for receiving fasteners.

The present invention also includes offset connecting plates, often referred to as "reducer plates", which are capable of permitting a pair of rails to be secured to each other in longitudinal arrangement, such that they are parallel to each other, but which are transversely offset from each other. This form of offset connecting plate is comprised of a flat wall with a pair of outwardly-struck structural walls at each of the ends thereof, which are spaced apart and generally parallel to each other. The outwardly-struck structural walls are provided with the tab-receiving slots and a set of the apertures for receiving the metal fasteners.

The present invention also comprises a plurality of close-out plates each of which is generally of a U-shaped construction. The close-out plate similarly includes a pair of spaced apart structural walls which are capable of engaging the flat walls of the rails. Moreover, the spaced apart walls of these close-out plates include slots capable of receiving the tabs of the rungs and similarly include a set of the pair of apertures for receiving the metal fasteners which may extend also through the flat wall of the rails and the close-out plates.

The modular support system of the present invention also includes floor mounting plates which are capable of being attached to vertically disposed rails and also to a floor of similar structural surface. Again, each floor mounting plate will include at least one slot and a set of the pair of apertures which are capable of being aligned with a set of the apertures in the flat walls of the rails.

The rails or structural components forming part of the present invention may also be supported in suspended relationship from a ceiling or similar structural wall. For this purpose, the present invention is provided with a plurality of brackets, referred to as "suspension brackets" which are capable of being attached to the flat walls of the rails. The brackets similarly have the spaced apart apertures for alignment with the set of apertures in the rails. Moreover, the suspension brackets are each provided with an outwardly struck flange for receiving a suspension rod or suspension cable. In like manner, the present invention provides mounting brackets, again referred to as "suspension brackets" for securement to the ceiling or a similar existing structural member. The mounting bracket for attachment to the ceiling is similarly provided with an outwardly struck plate for receiving the upper end of the suspension cable or suspension rod.

In order to permit angular orientation or directional change of the various ladders froming the part of the support system, a so-called "tee" intersection is provided and, in addition, a "90°" intersection is provided. For the purpose of the invention, a plurality of such tee and 90° intersections would be provided. These tee and 90° intersections are substructures which are also constructed from a plurality of rails and a plurality of rungs. However, due to the fact that the tee intersections and the 90° intersections require different sizes of rungs and different shapes, they are provided as substructures or substructural components.

As used herein, the term component generally refers to any of the existing single parts forming part of the support system, as for example, the rails, the various brackets, the rungs, support columns and the like. The substructural components or substructures usually include more than one of these components, as for example, a plurality of rungs and a plurality of rails, in order to form, for example, the tee intersections and the 90° intersections or a platform comprised of rails and rungs connected together.

The modular support systems of the present invention may be designed for either permanent or semipermanent installation or even temporary installation. The components are uniquely designed so that they can be rapidly assembled and disassembled in a relatively small amount of space and in a minimum amount of time. Nevertheless, they are also designed so as to provide the necessary structural integrity for a permanent or a semipermanent installation. The various components of the support system are uniquely designed so that a wide variety of arrangements may be provided with a minimum number of components. Moreover, the components are uniquely designed so that sharply angled corners can be avoided where desired and the transition from one direction to another can take place through wide arcs or angles. In this way, undue stress is avoided on the relatively thick cables or conduit.

The support systems of the present invention are capable of being used in all of the environments as previously described, in power stations, heavy industries, commercial buildings, port installations, hospital and public buildings. Moreover, the support systems of the present invention can also be used as shelving and benches if desired, although they are uniquely designed as cable and conduit support systems. The various components facilitate on-site erection with the directional changes. The various angles and the tees and the reducers permit easy assembly and convenient arrangement at an on-site location.

The modular support system can be easily supplied in knocked-down flat packs offering compact storage and transportability. Even moreso, if desired, many of the components can be cut to individual required lengths by means of hand tools and adjusted to individual field applications and locations. One of the unique aspects is that no welding or other form of permanent structural attachment is required, and the use of highly skilled personnel is not necessary in order to assemble the various components.

Additional advantages and versatility of the modular support systems of the present invention will become apparent by reference to the accompanying drawings which are hereinafter described and which components are more fully described in the following detailed description.

BRIEF DESCRIPTION OF THE DRAWINGS

Having thus described the invention in general terms, reference will now be made to the accompanying drawings in which:

DETAILED DESCRIPTION OF A PREFERRED EMBODIMENT

Figure 1:
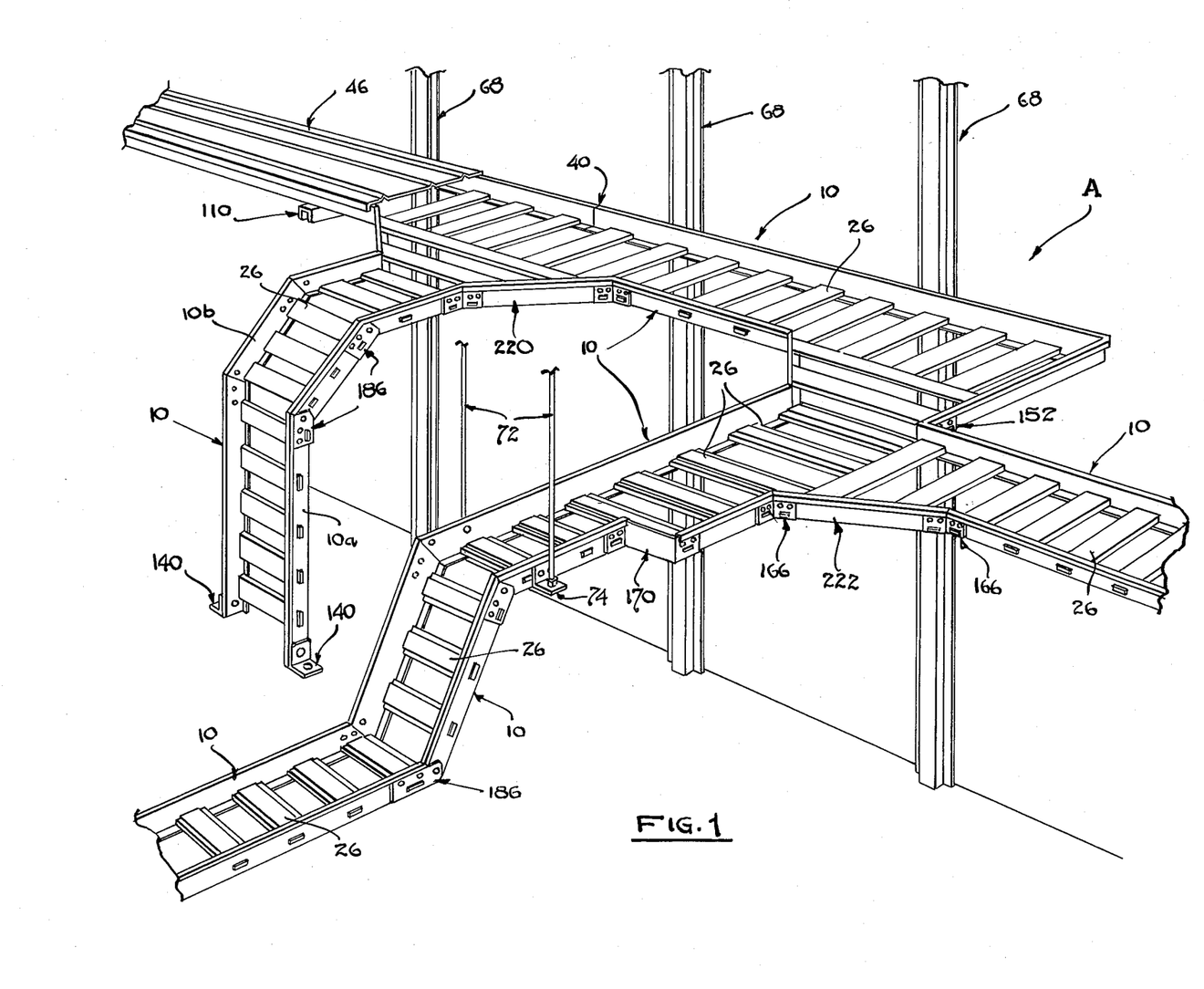
FIG. 1 is a perspective view of one arrangement which can be achieved with the components of the modular support system of the present invention.

Referring now in more detail and by reference characters to the drawings which illustrate preferred embodiments of the present invention, A designates a modular support system and which shows one assembled arrangement in FIG. 1. It should be understood that various arrangements can be achieved with the components forming part of the support system as hereinafter described in more detail.

Each of the components of the modular support system as hereinafter described are preferably formed of a relatively light-weight, but fairly rigid metal, such as aluminum. In this case, the gauge of aluminum would be chosen in order to conform to the load-bearing requirements in the support system. However, it should be understood that other metals such as steel and the like could also be employed. In addition, the components forming part of the modular support system could even be made of plastics and preferably the reinforced plastics, such as fiberglass-epoxy resin composites and the like.

Figures 2, 3, 4:
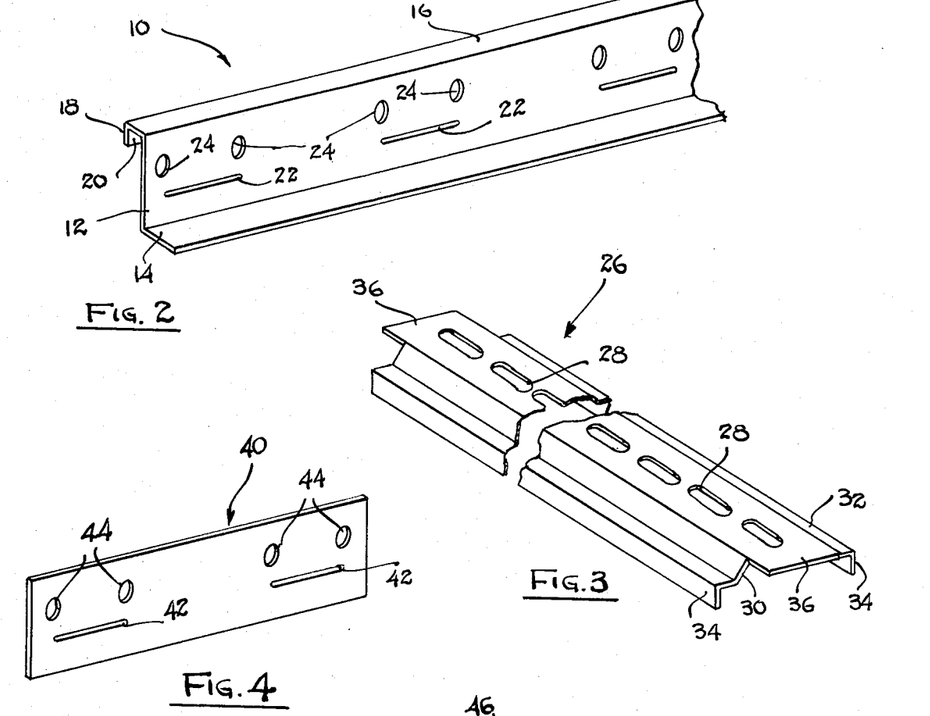
FIG. 2 is a perspective view of one of the rails forming part of the modular support system of the present invention.
FIG. 3 is a perspective view of one of the rungs forming part of the modular support system of the present invention.
FIG. 4 is a perspective view of one form of connecting plate forming part of the modular support system of the present invention for connecting the rails in endwise longitudinally extending relationship.

The modular support system includes a plurality of rails 10, one of which is illustrated in FIG. 2. Each of the rails 10 are comprised of a flat vertical web or structure wall 12 having an integrally formed bottom flange or plate 14, which is designed to serve as a support for the rungs hereinafter described. Integrally formed with and extending outwardly from the upper edge of the web 12 is a top wall 16 which extends in a direction opposite to the ease plate 14. The top wall 16 is integrally provided with a depending flange 18 which is spaced from the web 12 by means of a space or opening 20 and which flange 18 is also parallel to the web 12.

The rails 10 have been described in terms of being disposed in a relatively horizontal plane and in an upright position. However, it should be understood that the rails can be oriented in a variety of positions as hereinafter described.

The rail 10 as well as the other components of the support system, as hereinafter described, can easily be formed in any of a number of known metal forming operations. Specifically, the rail 10 can be formed from a single sheet of metal which is bent into the desired configuration on a bending brake or the rail 10 can be cast in the manner as illustrated or otherwise formed by other metal forming techniques known in the art.

The support rail 10 is provided in the web or structural wall 12 with a plurality of longitudinally spaced slots 22 and which are spaced apart from each other at regular intervals. It can be observed that the slots 22 are located near the base plate 14 and each have the same size and shape. In addition, the web 12 may also be provided with pairs of fastener receiving apertures 24 also spaced longitudinally along the web 12 and in regularly spaced apart location. Each pair of apertures 24 is referred to as a "set" and it is important that each aperture in each set is spaced apart from the aperture of each set by the same distance. The aperture 24, or the bottom wall 14, or for that matter, the top wall 16 and flange 18 constitute a means associated with the structural wall 12 for connection to a generally stationary structural member, e.g., a stationary wall, or the like.

Figures 23, 24, 25:
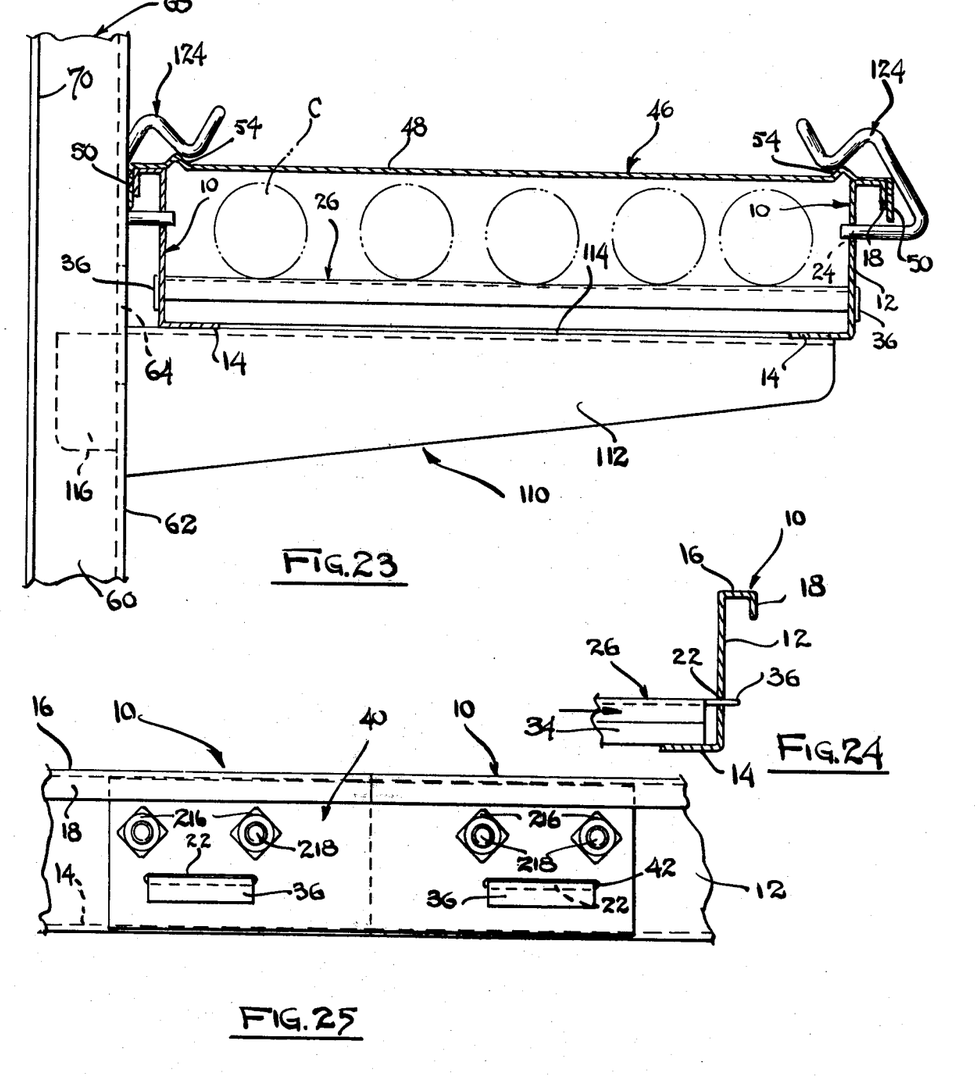
FIG. 23, is a fragmentary side elevational view, partially in section, and showing one of the supporting brackets of FIG. 15 connected to one of the support columns with the pair of rails connected by rungs and a cover member disposed over the rails.
FIG. 24 is a vertical sectional view, showing the assembly of one of the rungs to one of the rails forming part of the present invention.
FIG. 25 is a fragmentary side elevational view showing the attachment of two of the rails in longitudinal endwise relationship by means of the connecting plate of FIG. 4.

The modular support system A also comprises a plurality of rungs 26 which are more fully illustrated in FIG. 3. The rungs 26 are capable of extending between a pair of spaced apart rails 10 or other components forming part of the support system. The rungs 26 are each comprised of a longitudinally extending top plate 28 having a pair of downwardly and outwardly struck wall sections 30 integrally formed therewith on the longitudinal margins of the plate 28. The wall sections 30 integrally merge into longitudinally extending horizontally disposed walls 32 and the walls 32 each integrally merge into vertically disposed longitudinally extending support legs 34. The support legs 34 are capable of engaging the base plates 14 on each of a pair of opposed rails 10, in the manner as illustrated in FIG. 24.

The top plate 28 of each rung is also integrally formed on each of the opposite transverse ends with outwardly projecting tabs 36. The tabs 36 have the approximate same size and shape as the slots 22. The overall vertical height of the rungs 26 are such that the tabs 36 are capable of extending into the elongate slots 22 on each of a pair of opposed rails 10 when the support legs 34 are disposed upon the base plates 14. After the tabs 36 are extended through the elongate slots 22 on each of a pair of opposed rails 10, the tabs 36 can be bent downwardly or upwardly in order to hold the rungs in a locked position with respect to the pair of spaced apart rails.

The rungs 26 have each been described as having longitudinal top plates 28, walls 30 and 32 and legs 34. In this respect, the components are longitudinal by extending with respect to the dimension of the rungs 26. However, it should be observed that with respect to the assembled relationship with a pair of spaced apart rails, the top wall 28, along with the wall sections 30 and 32 and legs 34, would all be transversely extending.

Both the rails 10 and the rungs 26 may be provided in varying length in the modular support system. It should be observed that the rungs 26 could be spaced along the rails 10 in any desired positional arrangement. Thus, to provide greater load bearing surface support, the rungs would be fairly close together, whereas to form platforms which are only designed to carry relatively light loads, the rungs can be spaced farther apart from each other.

The modular support system A also comprises relatively flat connector plates 40 which are provided with elongate slots 42, similar to the slots 22, near each of the ends thereof. Moreover, the connector plates 40 are each provided with pairs of apertures 44 disposed above and in relative alignment with the slots 40. In this way, a pair of rails 10 may be connected in endwise aligned relationship. The tabs 36 of the rungs 26 will thereupon extend through the elongate slots 22 in the rails and the elongate slots 42 in the connector plates 40 at the regions where the pair of aligned rails are joined. Moreover, bolts or like fasteners may be provided to extend between the apertures 44 in the flat connecting plate 40 and the apertures 24 at the ends of each of the endwise abutting rails 10.

Figures 5, 6:
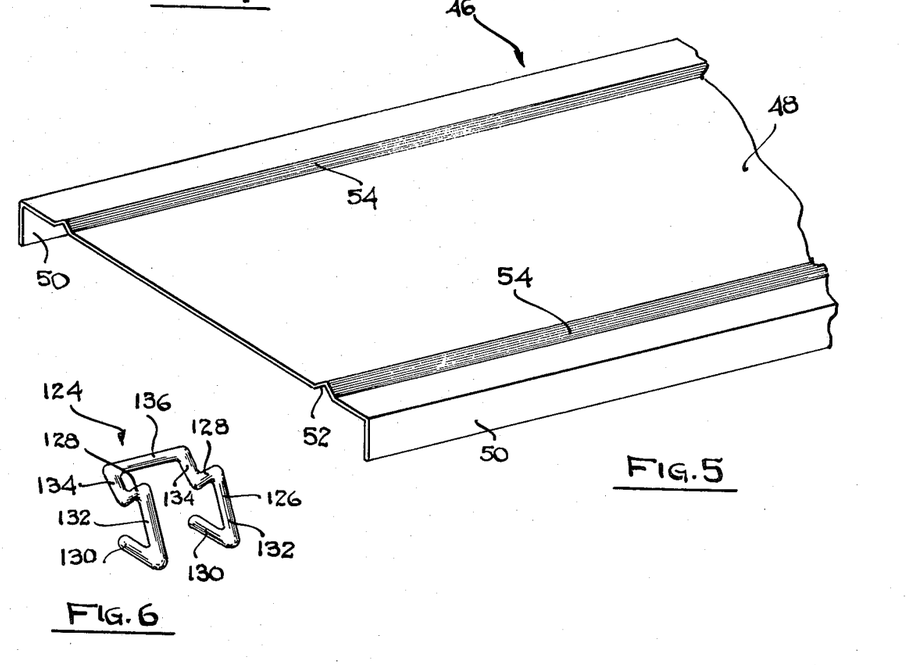
FIG. 5 is a perspective view of one of the cover plates forming part of the modular support system of the present invention and which are capable of being disposed over a pair of spaced apart rails.
FIG. 6 is a perspective view of a clamp forming part of the support system of the present invention for connection of a cover plate to a rail in accordance with the present invention.

The present invention also provides tray covers 46 which are designed to be disposed over and supported on a pair of spaced apart rails 10 and disposed over the rungs 26 in spaced relation to the upper surfaces of the rungs. Each of the tray covers 46 generally comprise relatively flat plates 48 which are integrally provided with vertically disposed spaced apart depending legs 50 on each of the longitudinal edges thereof. The top plate of each tray cover or so-called "cover plate" 46 is also provided with a pair of grooves 52 on its under-surface which form upstanding inverted V-shaped ridges 54 on the top surface of the plate 48. These ridges 54 are designed to be engageable with clamps hereinafter described for clamping the cover plates 46 to the rails 10. Moreover, the tray covers 48 each have a transverse, internal dimension or width at least equal to the overall width of a pair of the rails 10 when in the assembled relationship, that is, with the rungs 26 extending therebetween. In this way, the depending legs 50 will extend over the depending flanges 18 on the rails 10 and may snugly engage the depending flanges 18. It should be observed that in an alternate arrangement the tray covers 48 could have a width less than that of the rails 10 and slightly less than the transverse assembled dimension between the webs 12 so as to rest upon the rungs 26, although the arrangement as illustrated is preferred.

The length of each of the cover plates could be equal to or less than the length of each of the rails 10. While there is nothing to prohibit the length from being greater than the length of the rails 10, this is not as desirable inasmuch as shorter tray covers provide a greater degree of utility in enabling various assembled constructions to be formed. In the preferred aspect, the cover plates should be relatively short so that only one or a few such cover plates may be removed at any point in time for facilitating maintenance or inspection.

Figures 13, 14, 15, 16, 17, 18:
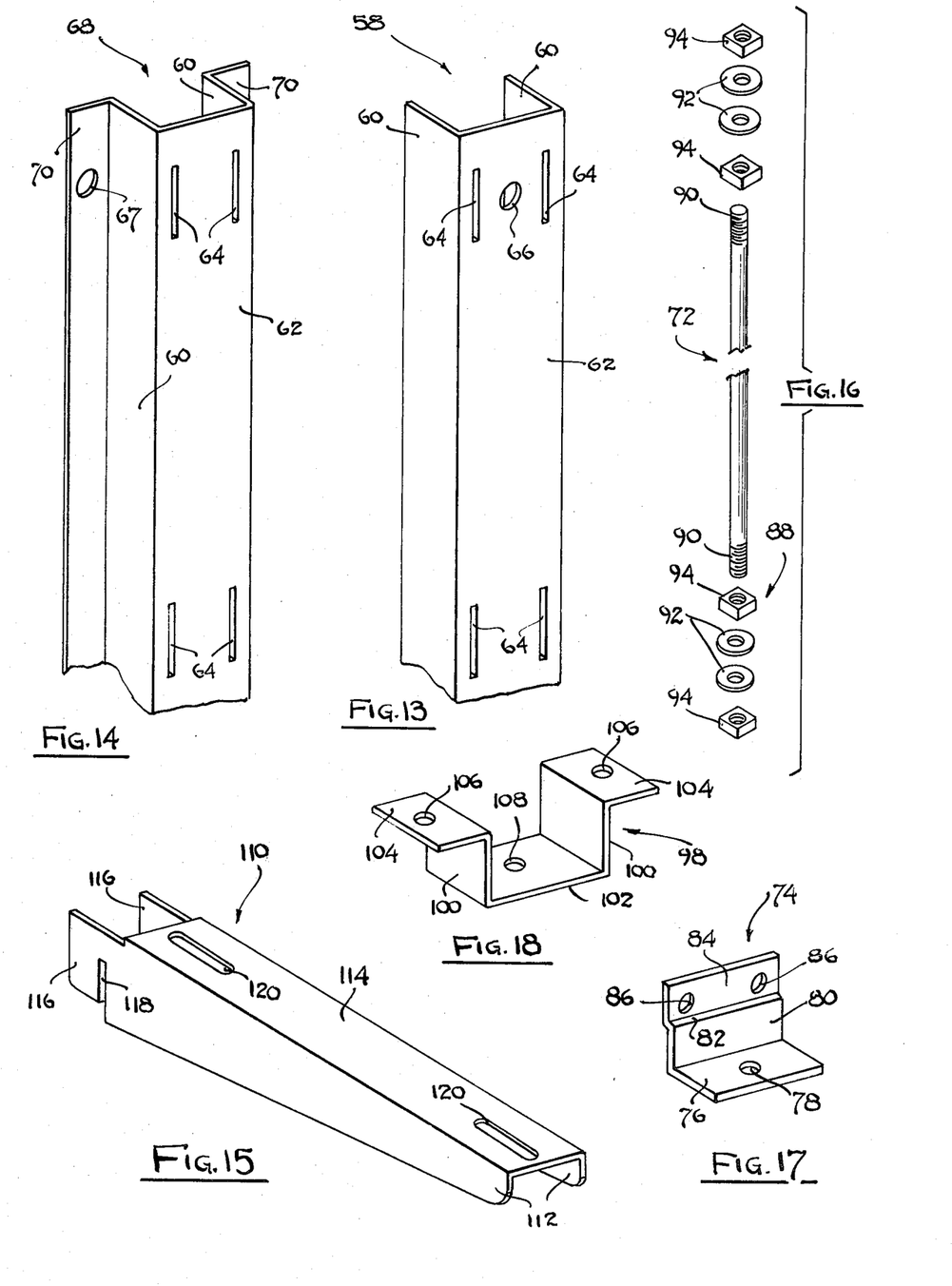
FIG. 13 is a perspective view of one form of a support column forming part of the support system of the present invention.
FIG. 14 is a perspective view of another form of support column forming part of the support system of the present invention and which may be attached to an existing structural wall.
FIG. 15 is a perspective view of a support bracket which may be attached to either of the support columns of FIG. 13 or FIG. 14 for supporting a platform thereon.
FIG. 16 is an exploded perspective view of a suspension rod and the components thereof which may be used for suspending some of the components of the present invention from a ceiling or similar structural member.
FIG. 17 is a perspective view of one form of suspension rod bracket which may be connected to a rail or similar structural component of the present invention and for receiving one end of the suspension rod of FIG. 16.
FIG. 18 is a suspension rod bracket forming part of the support system of the present invention and and which may be secured to a ceiling or similar structural member for receiving the upper end of the suspension rod of FIG. 16.

The system of the present invention also provides a plurality of support columns or so-called "risers" 58, in the manner as illustrated in FIG. 13 of the drawings. The support columns 58 are designed to be secined to a floor mount as hereinafter described although they could be mounted to a wall or other existing vertical structural component, as for example, in a building, tunnel or the like. The columns 58 are used for supporting the various rails and tray covers and rungs as hereinafter described. In this way, the use of the support columns 58 adds a much greater degree of versatility to the system of the present invention.

The support columns 58 are generally comprised of a U-shaped member having a pair of vertically disposed spaced apart walls 60 connected by a flat connecting wall or bight 62. In this case, the flat connecting wall 62 would be provided with a plurality of elongate vertically extending slots 64 comparable in dimension to the slots 22. In addition, the wall 62 would be provided with one or more apertures 67 disposed between the slots 64 to receive fasteners, as for example, screws, bolts, or the like.

The present invention also provides a modified form of support column or riser 68 which is more fully illustrated in FIG. 14 of the drawings. In the case, the support column 68 is similar to the support column 58. However, the support column 68 is provided with a pair of outwardly struck flanges 70 on each of the pair of spaced apart vertically disposed legs 60. Moreover, the elongate slots 64 would still remain in the connecting wall 62. However, in this form of support column, the fastener receiving apertures such as the apertures 67 would be located in the flanges 70 in the manner as illustrated.

This latter type of support column 68 is preferred for securement to the wall or other structural surfaces of the building or like structure. The vertical support members 58 are preferably used with floor mounts, as indicated, for supporting a plurality of other system components, where attachment of the vertical support columns to a wall is not necessarily, desirable.

Platforms used in the support system can be fabricated from a pair of spaced apart rails 10 connected by the rungs 26 and which may have tray covers 46 disposed thereon. These platforms may be supported by vertical support columns such as the vertical support columns 58 or 68, as illustrated in FIG. 1 of the drawings. The platforms may also be supported by suspension rods 72 where a ceiling or similar surface or beam will carry the load on the platform. The suspension rods 72 are more fully illustrated in FIG. 16 of the drawings and if desired could adopt the form of suspension cables as opposed to suspension rods. The suspension rods 72 are utilized with suspension brackets 74 and 98, the latter of which are also more fully respectively illustrated in FIGS. 17 and 18 of the drawings.

The suspension bracket 74 generally comprises a relatively horizontal rod receiving plate 76 having an aperture 78 formed therein in order to receive the lower end of a suspension rod 72. In addition, the cable plate 76 integrally merges into an upstanding intermediate plate 80 which is integrally formed with and located at approximately right angles to the plate 76. The vertically disposed plate 80 is also provided with a relatively short off-set step section 82 integrally formed therewith and which, in turn, integrally merges into a vertically disposed upstanding mounting plate 84. The mounting plate 84 is provided with set of fastener receiving aperture 86 in order to receive any of the previously described conventional fasteners, as for examples, bolts and nuts, screws or the like. The apertures 86 in the set on the plate 84 will have the same spacing as the apertures 22 in each set on the rails 10, or other components.

When it is desired to support any one or more of the components forming part of the system by means of the suspension rods 72, the suspension bracket 74 may be employed. In this case, the suspension bracket may be secured to one of the side rails 10 by extending bolts or similar fasteners through the apertures 86 in the bracket and one of the apertures 24 in the web 12 of the side rail. In like manner, the bracket 74 could be attached to any of the other components having matching apertures equivalent to the apertures 86.

After attachment of the suspension bracket 74, the suspension rod 72 may have its lower end attached to the suspension bracket 74. For this purpose, the suspension rod 72 is provided with a locking means 88 at its lower end. The locking means 88 is generally comprised of an externally threaded shank 90 on the lower end of the rod and which is capable of extending through the aperture 78 in the rod receiving plate 76. A pair of washers 92 and a pair of locking nuts 94 are provided for securing the rod 72 to the bracket 74. The locking nuts 94 are thereupon screwed on the threaded shank 90 with one washer and nut engaging the underside of the plate 76 and the nut and washer engaging the upper surface of the plate 76. Otherwise, other forms of conventional attachment mechanisms could be employed. For example, a conventional screw or the like could be employed for securing to a support beam or other structure. Moreover, a Molly bolt or toggle bolt could be employed at the upper end in order to secure the suspension cable 72 to any form of support structure.

FIG. 18 represents the upper suspension bracket 98 which is used to retain the upper end of the suspension rod 72. The bracket 98 is comprised of a U-shaped structure having a pair of spaced apart vertically disposed walls 100 connected by a lower horizontal connecting wall or so-called "bight" 102. This suspension bracket 98 is useful for mounting to a relatively horizontal surface.

Each of the vertically disposed walls 100 are provided with outwardly struck mounting flanges 104. Each of the outwardly struck flanges 104 is provided with an aperture 106 for receiving a conventional fastener of the type used to secure the bracket to a ceiling or overhead structure member. Thus, concrete bolts or the like may be used. In addition, the suspension rod 72 is provided with an upper mounting means 88 similar to the lower mounting means 88. The upper end of the rod 72 is inserted through an aperture 108 formed in the connecting plate 102. Again, the rod 72 would be mounted to the suspension bracket 98 in the same manner as previously described in connection with the bracket 74.

When using the support columns 58 or 68, the rails 10 in pairs may be supported in spaced apart relationship by means of support arms 110 which engage the underside of the pair of spaced apart rails 10. One such support arm 110 is more fully illustrated in FIG. 15 of the drawings. It can be observed that the support arm 110 is of inverted U-shaped cross section and is comprised of a pair of spaced apart vertically disposed plates 112 connected at their upper ends by means of an upper flat connecting plate or so-called "bight" portion 114. The legs 112 are tapered inwardly and upwardly toward the forward end of the plate 114 as illustrated in FIG. 15 of the drawings.

At the rearward ends, the two leg portions 112 are integrally formed with attaching flanges or tabs 116 which are provided with vertically extending slots or notches 118. The tabs 116 are designed to extend into the pair of elongate notches 64 formed in the vertically disposed support columns 58 and 68 and the notches 118 are designed to engage the inner and outer surfaces of the plate 62 adjacent to the slots 64. The slots or notches 64 and 118 are sized so that they are at least slightly greater in the vertical dimension than the tabs 116. In this way, the tabs 116 will extend through the notches 64 and 118 permitting the support arms 110 to drop down and to be captively engaged with the columns.

In addition, the connecting plate 114 is provided with a plurality of horizontally located slots 120. In this way, various components can be connected to the support arms 110. The slots 120 enable the rungs 26 to be secured to the brackets 110 by means of fasteners extending through the slots 120 and the slots 28 in the rungs 26.

In many cases, it may be desirable to rigidly secure the cover plates 46 to the rails 10 over the various platforms comprised of the support rails 10 and the rungs 26. For this purpose, the system of the present invention provides a plurality of tray cover spring clamps 124 which are more fully illustrated in FIG. 6 of the drawings. The tray cover clamps 124 each comprise a pair of C-shaped sections 126 comprised of upper and lower spaced apart horizontally extending legs 128 and 130 respectively and which are connected by a vertically extending bight portion 132. Moreover, each of the upper arms 128 integrally merge into vertically extending rod sections 134 and the rod sections are connected together by means of a bight section 136. To secure the clamps 124 in order to retain the tray covers 46 in relation to the rails 10, the lower legs 130 will extend into a pair of the spaced apart apertures 24 in the web 12 of the rails 10. Moreover, the upper arms 128 will engage the upper surface 48 of the cover 46, overlying the ridge portions 54.

Certain of the rails 10 along with the rungs 26 extending therebetween may be disposed in a vertical or upwright position or in a partial upright position, in order to serve as a ladder. In many cases, it may be desired to rigidly secure the lower ends of platforms having these vertically disposed rails 10 to the floor or other similar supporting structure. For this purpose, the system of the present invention provides rail connector brackets 140 which are more fully illustrated in FIG. 7 of the drawings.

Figures 7, 8, 9, 10:
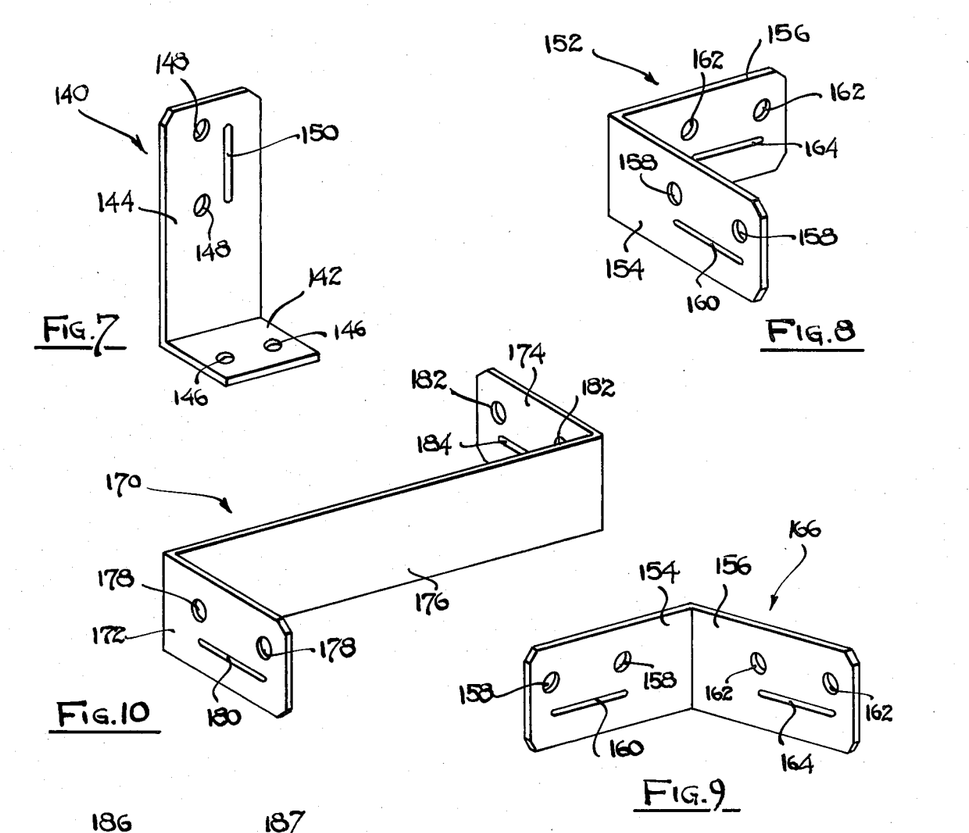
FIG. 7 is a perspective view of a floor mounting plate forming part of the support system of the present invention for securing a vertically disposed rail to a floor or similar surface.
FIG. 8 is a perspective view of another connecting plate forming part of the support system of the present invention and which may be used for connecting a pair of rails at a right angle relationship.
FIG. 9 is a perspective view of a further form of connecting plate which may be used for connecting a pair of rails in endwise relationship but at an obtuse angle.
FIG. 10 is a perspective view of a reducer plate forming part of the support system of the present invention which may be used for connecting pairs of longitudinally extending rails to additional pairs of longitudinally extending rails with reduced space therebetween.

The rail connector brackets 140 generally comprise a horizontally disposed plate 142 and a vertically disposed plate 144 generally forming an L-shaped bracket. The connector plate 142 is provided with a set of apertures 146 for receiving conventional fasteners in order to attach the plate 140 to the floor or other similar supporting structure. The fasteners used would depend upon the material of which the floor or other supporting surface is formed. Thus, concrete bolts, etc. may be used. The vertically disposed plate 144 is similarly provided with a set of apertures 148 for attachment to the components forming part of the apparatus, as for example, the rails 10. The apertures 148 have the same regular spacing as the apertures 24 in the rails 10. In addition, the vertically disposed plate 144 is similarly provided with at least one or more elongate slots 150 similar to the slots 22, 42 or 65 in order to receive the tabs on any of the components forming part of the system of the present invention.

In many cases, when assembling the modular components of the present invention, it is desirable to locate a pair of rail sections 10 at right angles with respect to each other. In this case, it may be desirable to create a first platform or shelf which is perpendicularly located to a second platform or shelf. For this purpose, the system of the present invention provides a plurality of connector brackets 152 which are more fully illustrated in FIG. 8 of the drawings.

The connector brackets 152 each include a first plate 154 and a second plate 156 integrally formed therewith and located at right angles to the first plate 154. The plate 154 is provided with a pair of apertures 158 designed to receive any of the type of fasteners previously described. The apertures 158 have a size and location relative to the apertures 24, for example, or the apertures 44, for example, as well as the other apertures forming part of the components in the system of the present invention. In like manner, the plate 154 is provided with an elongate slot 160 in order to receive tabs, such as the tabs 36, on the rung 26.

The plate 156 is also provided with a pair of spaced apart apertures 162 which are also sized to recieve conventional fasteners and can be aligned with other apertures in the other components forming part of the present invention. In the same respect, the plate 156 is provided with an elongate slot 164 which is similarly sized and located to receive the tabs on various components, as for example the tab 36 on the rung 26. It can be observed that the connector bracket 152 is designed to connect a pair of rails in perpendicular relationship to each other.

The present invention also provides connector brackets 166, more fully illustrated in FIG. 9, and which are similar to the brackets 152 and include the same apertures 158 and 162 therein. These connector brackets 166 also include the elongate slots 160 and 164 therein. However, the plates 154 and 156 of the connector brackets 166 are located with respect to each other at an oblique angle. In this way, a pair of rails may be connected to each other at an oblique angle. It should be understood in connection with the present invention that brackets similar to the bracket 166 could also be provided in order to connect a pair of rail sections at a desirable angle with respect to each other, although the cables or conduit would not normally be bent at a sharp or acute angle.

The present invention further provides reducing connector brackets 170, more fully illustrated in FIG. 10, and which are designed to permit merger of a platform section of a first width to a platform section of a reduced width. Thus, the brackets 170 permit attachment of a rail forming part of a pair of rails in a platform section of a first width to a rail forming part of a platform section of reduced width. Thus, if the assembly is constructed so that a first platform section or ladder section is constructed of a width, as for example, three feet between each of the rails, and this width is to be reduced to an extension thereof to about two feet, the reducer brackets 170 of the present invention may be employed.

The reducer brackets 170 comprise a first plate section 172 and a second plate section 174 which is parallel therewith but spaced therefrom by a certain selected distance and is connected to the first plate section 172 by means of a connecting plate 176. It can be observed that the connecting plate 176 is essentially perpendicular to the plates 172 and 174. However, it should also be observed, in connection with the present invention, that the connector plate 176 could be angulated at any desired angle with respect to the plates 172 and 174. In the preferred aspect, the plate 176 is located in a perpendicular arrangement in order to permit contraction of a platform or ladder section from a wider width to a more narrow width.

The plate 172 is provided with a pair of apertures 178 similar to the apertures 158 and are also equidistantly spaced apart from each other so as to accomodate conventional fasteners with respect to the other components of the present invention. Moreover, the plate 172 is provided with an elongate slot 180 in order to accommodate a tab on some of the components forming part of the present invention. In like manner, the plate 174 is provided with a pair of spaced apart apertures 182 similar to the apertures 178, along with an elongate slot 184 similar to the elongate slot 180. In this same respect, the apertures 182 serve the same function as the apertures 178 and the elongate slot 184 serves the same function as the elongate slot 180.

The system of the present invention also includes a plurality of brackets, referred to as riser plates 186 for securing two rails or other members in an angulated position, as for example, the two rails designated as 10a and 10b as illustrated in FIG. 1 of the drawings. One such riser plate 186 as more fully illustrated in FIG. 11 of the drawings comprises a plate 187 having an elongate slot 188 similar to the slots 22 for receiving the tabs 36 on the rungs or other components. In addition, the riser plate includes a pair of apertures 190 disposed in spaced relationship to the elongate slot 188 and which would cooperate with the apertures 24 in the rails 10 or similar apertures in the other components. These apertures 190 are also designed to receive conventional fasteners of the types previously described. In addition, the riser plate 186 would be provided with an additional aperture 192, or otherwise a pair of apertures, although one is shown. The aperture 192 is designed to be connected to one of the apertures 24 on the next adjacent rail which may be in an angulated position, as for example, 135° angle with respect to the first of the rails. The aperture 192 is located in a plane slightly below the apertures 190 in order to provide for mating relationship to the apertures 24 in the adjacent rail 10b.

Figures 11, 12:
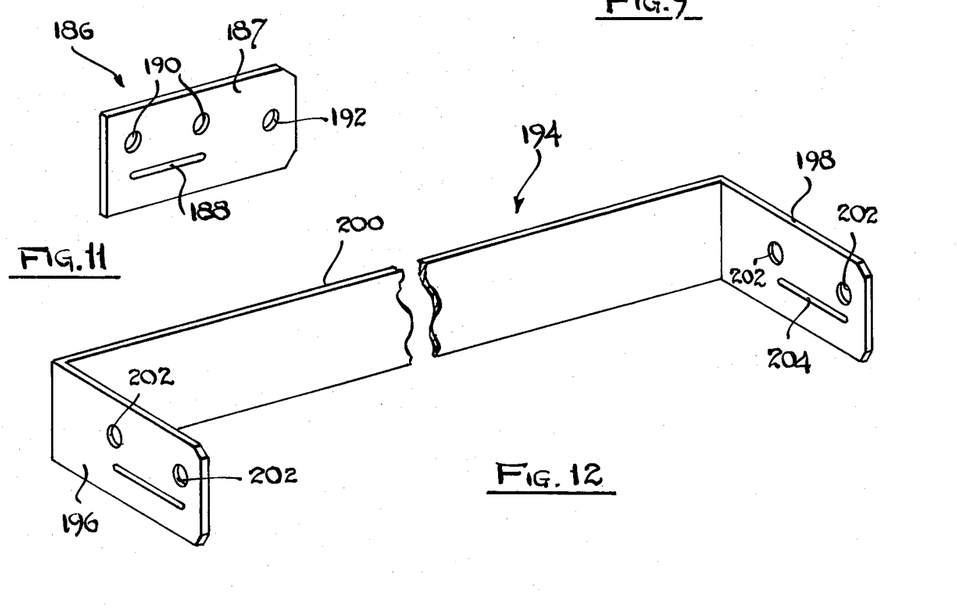
FIG. 11 is a perspective view of a riser plate forming part of the support system of the present invention and which may be used for connecting a pair of rails in angulated relationship.
FIG. 12 is a perspective view of a close-out plate forming part of the support system of the present invention and which may be used to extend over the ends of a pair of spaced apart rails.

The support system of the present invention also provides a plurality of close-out plates 194, one of which is more fully illustrated in FIG. 12 of the drawings. The close-out plates 194 are generally provided in order to form a vertical closure wall at the end of a pair of spaced apart rails used to form a platform.

The close-out plates 194 are generally comprised of a pair of first and second spaced apart and generally parallel structural plate sections 196 and 198 which are connected by a connecting web or plate 200. Each of the plates sections 196 and 198 are provided with a set of apertures 202 which are sized and located so as to be alignable with the apertures 24 in the rail 10 or the other sets of apertures in the other components of the present invention as for example, the sets of apertures 44 in the connecting plate 40. In addition, each of the plate sections 196 and 198 are provided with slots 204 which correspond with the slots 22 in the rails 10 and the slots 42 in the connector plates 40, as well as the slots in other components of the present invention.

In order to provide an end closure for a pair of spaced apart rails which are connected by rungs 26, the plates 196 and 198 are disposed along the side wall or web 12 of a pair of spaced apart rails 10 and fasteners are extended through one set of apertures 24 in the rails and the apertures 202 in the close-out plate 194. In like manner, an end rung, that is a rung located near the end of the pair of spaced apart rails, may also have the tabs 36 extended through the elongate slots 204 in the close-out plate 194.

One of the unique aspects of the present invention is that each of the sets of apertures are properly sized and located in each of the components such that they are always alignable. Thus, for example, the apertures in the various brackets 152, 166 or 170 and 40, for example, are always alignable with each other and alignable with the apertures 24 in the rails 10. Even more so, the slots in each of these various components of the present invention are always located with respect to the sets of apertures such that a tab in any one of the members will always extend through the slots when the apertures are aligned. This construction enables easy assembly of the parts and a wide versatility of arrangements of the various components.

Figures 19, 20, 21, 22:
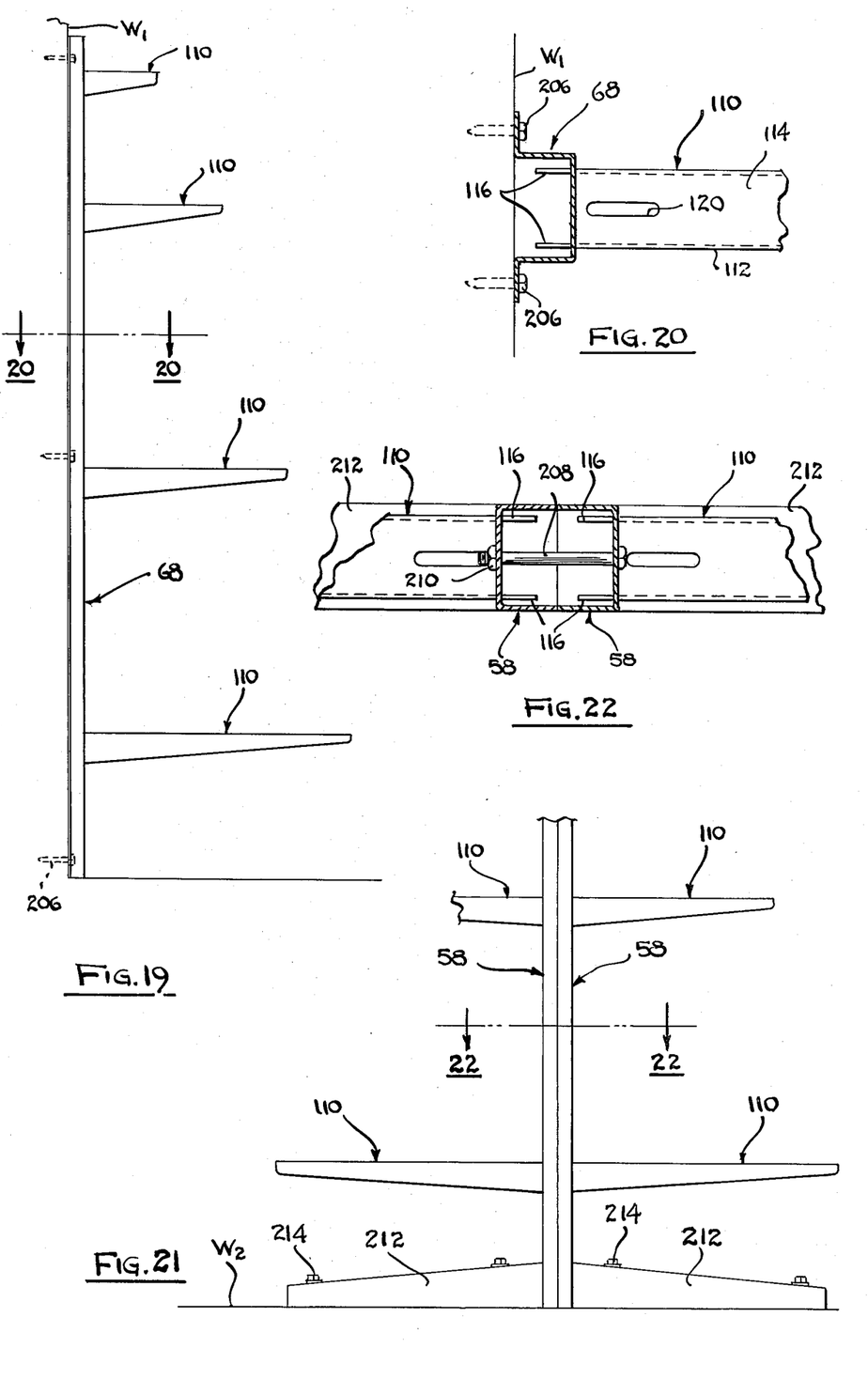
FIG. 19 is a side elevational view showing one of the support columns of FIG. 14 secured to a wall or similar structural surface and having a plurality of outwardly extending support brackets of FIG. 15 secured thereto.
FIG. 20 is a horizontal fragmentary sectional view taken along line 20—20 of FIG. 19.
FIG. 21 is a side elevational view showing a pair of the support columns of FIG. 13 connected together and a plurality of supporting brackets extending outwardly from each of the support columns.
FIG. 22 is a horizontal fragmentary sectional view taken along line 22—22 of FIG. 21.

FIGS. 19 and 20 more fully illustrate the technique used for securing the columns 68 to a vertically disposed structural wall $W_1$ by means of a plurality of fasteners 206. In this case, the fasteners 206 would extend through the apertures 67 on the flanges 70 of the support column. In addition, the tabs on each of the support brackets 110 would be extended into the slots 64 in the manner as illustrated in FIG. 20. In this way, the support brackets 110 are removably locked into place in the columns and are thereby capable of supporting rails or other components forming part of the support system of the present invention.

FIGS. 21 and 22 more fully illustrate an arrangement using a pair of the support columns 58. In this case, it can be observed that two support columns 58 are located so that the opened U-shaped channel sections face each other in the manner as illustrated in FIG. 22. In addition, a plurality of fasteners, as for example, bolts 208, extend through the apertures 66 in the pair of facing support columns 58 and are secured by means of a locking nut 210.

The pair of support columns 58 are retained in an upright position by means of a pair of floor mounting brackets 212. The brackets 212 may be physically secured to the columns 58 in the same manner as the support brackets 110 are secured to the columns. Otherwise, the brackets 212 could be formed as a unitary member with a rectangularly shaped recess formed therein in order to receive the lower end of the two secured support columns 58. In this case, the brackets 212 would be secured to the floor or other lower structural surface designated as $W_2$ as by bolts 214.

After the two support columns 58 have been secured to the floor through the use of the floor mounting brackets 212, the support brackets 110 may then be secured to the two support columns. It can be observed that support brackets 110 extend outwardly from each of the support columns in opposite directions. Again, by reference to FIGS. 19 and 21, it can be observed that brackets of varying sizes have been used, although it should be observed that brackets of the same dimension or different dimensions could be employed in connection with the present invention.

FIGS. 23–25 more fully illustrate an assembly of many of the components in accordance with the present invention. FIG. 24 shows the tab 36 extending through one of the elongate slots 22 in a rail 10. The tab 36 is initially shown as extending from a rung 26 through the slots in the rails with the support legs 34 on the rung 26 engaging the plates 14 on the rails 10. After the tabs 36 have been inserted through the slots 22, the tabs are then displaced, perhaps by bending the same upwardly or downwardly, so as to captively lock the rungs 26 to the support rails 10.

In FIG. 25, a pair of rails 10 are shown as being connected together by means of the connecting plate 40. In this case, it can be observed that the tabs 36 on each of the rungs at the ends of each of the endwise abutting rails 10 will extend through elongate slots 22 in each of the endwise abutting rails. The tabs 36 are shown bent downwardly to captively lock the rungs to the rails. In addition, FIG. 25 also illustrates locking nuts 216 and bolts 218 which extend through the support rails 10 and the connecting brackets 40 so as to secure the two end rails together in their locked position.

FIG. 23 also illustrates the arrangement of a support bracket 110 secured to one of the columns 68 and supporting a platform on the upper wall 114 thereof and constructed from a pair of spaced apart rails 10, connected by rungs 26. In this case, it can be observed that a tray cover or a cover plate 46 is disposed over the rails 10 with the downwardly extending flanges 50 on the cover plate extending over the flanges 18 on the rails. Moreover, it can be observed that clamps 124 are used to secure the cover plates 46 to the rails 10. The right-hand clamps have the two prongs 130 extending into a set of the apertures 24 on the rails with the upper end including the bight section 136 extending over the ridge 54 engaging the upper surface of cover plate 46 in the manner as illustrated. The left-hand clamp 124 is inserted into a pair of apertures 66 in the support columns 68 and also engages the left-hand side of the cover plate in the manner as illustrated. In this way, it can be observed that a plurality of cables C (shown in phantom lines) can be retained on the upper surface of the rungs 26 and are protected by the cover plate 46.

The cover plates 46 serve as an increased protective aid. Normally, most of the cables C are in shields or sheaths to render the same both water-proof and effectively dust-proof. However, the cover plates 46 provide an added degree of protection for the cables C.

Figure 26:
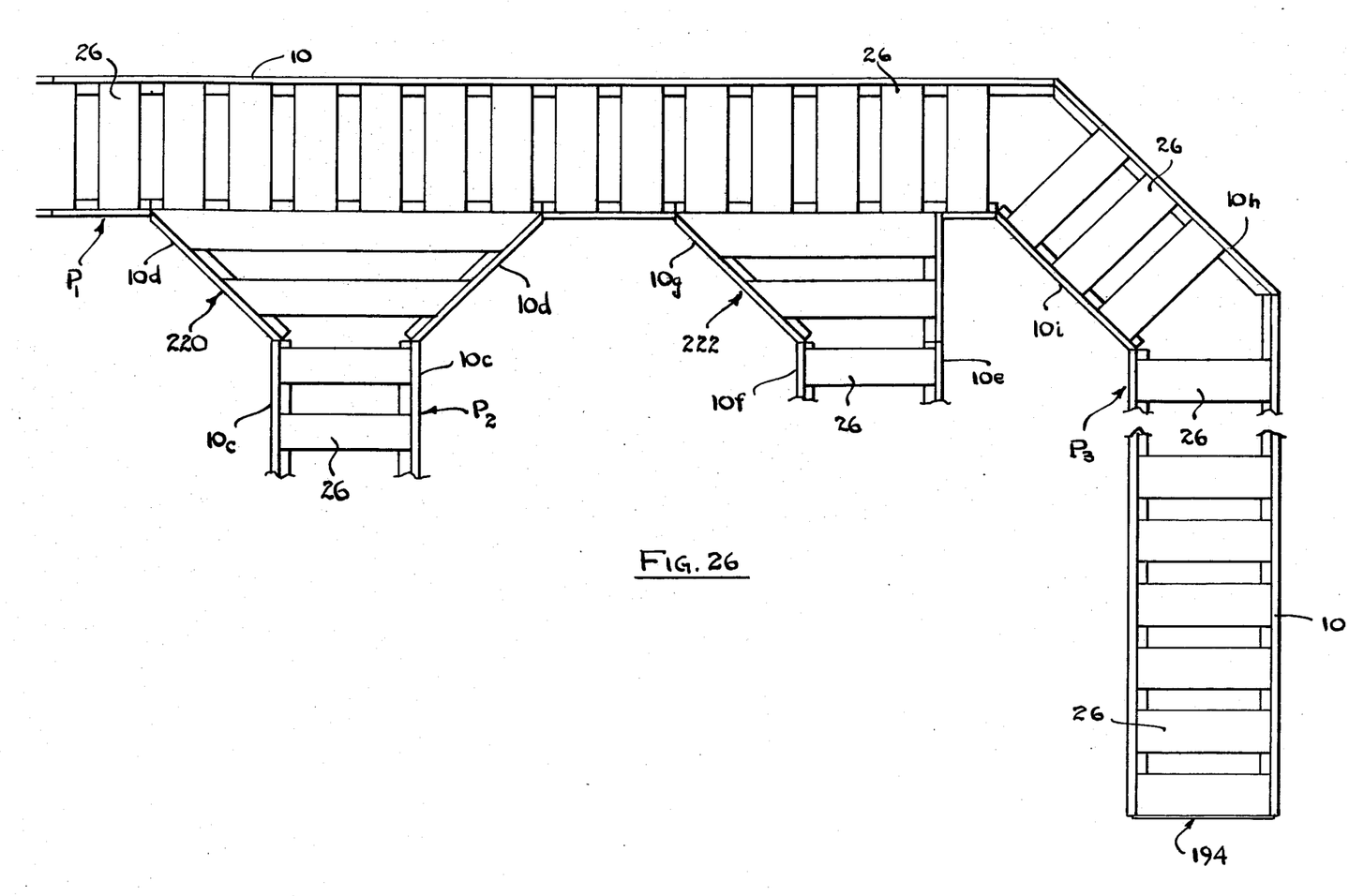
FIG. 26 is a top plan view showing a form of arrangement of various components forming part of the support system of the present invention and also illustrating a 90° intersection sub-structure and tee intersection sub-structure

The system of the present invention may also be provided with certain preassembled components, or so-called "sub-structural" components, as for example, a tee intersection 220 and a 90° intersection or 90° intersecting component 222, more fully illustrated in FIG. 26 of the drawings. In this case, it can be observed that the tee intersection and the 90° intersecting components are connected to longitudinally extending, essentially horizontally disposed platforms comprised of rails 10 and rungs 26.

It can be observed, by reference to FIG. 26, that a plurality of rails are connected in endwise relationship by means of connecting plates 40 and the rungs 26 extend between the rails 10 in a regular array. In order to divert a cable from the longitudinal path, the cable may be routed into the tee intersecting component 220 through a relatively large radius and thereby diverted from the platform section designated as $P_1$ to a platform section designated as $P_2$. In this case, the platform section $P_2$ will be connected to the tee intersecting component 220.

The tee intersecting component 220 is comprised of a pair of rails 10c equivalent to the rails 10 and which are provided with outwardly diverging rail sections 10d at an angle of about 135°. In this way, the rail sections 10d can then be attached to the rails forming part of the platform $P_1$, by means of the connecting plates 166 of the type illustrated in FIG. 9 of the drawings.

The 90° intersection includes a pair of longitudinally extending rails 10e and 10f. The longitudinal rail 10f is shorter than the rail 10e and integrally merges into a rail 10g to provide a sufficient arc for a cable or conduit to extend into the 90° intersecting component. However, if the cable is traveling from left to right, as illustrated in FIG. 26, it is only necessary to have the wide angle allowance in the left-hand side of the intersecting component 222.

FIG. 26 also illustrates the use of a pair of rails 10h and 10i with rungs 26 extending therebetween in order to form an angled corner leading from the platform $P_1$ into another platform $P_3$. Again, the components, namely the rails 10h and 10i, along with the rungs 26 extending therebetween, could be formed as a preassembled or sub-structural component.

FIG. 1 more fully illustrates only one arrangement which can be achieved with the components of the present invention. However, FIG. 1 does show a wide versatility of various components being attached to each other. Thus, it can be observed that platform sections can merge through tee intersections and can then be angulated downwardly to a vertical direction in order to lower cables onto the floor. Additionally, the components of the present invention can be connected in such manner as to shift the cables from one elevation to another elevation through wide angles of diversion so as to avoid stress on the cables or conduit.

Thus, there has been illustrated and described a unique and novel modular support system which can be assembled and disassembled at an on-site location in a wide variety of arrangements and which therefore fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letter patent is:

1. A modular support system capable of being assembled at an on-site location, said modular support system comprising:
   (a) a plurality of support rails, each of said support rails being comprised of;
       (1) a structural wall,
       (2) means associated with said structural wall for connection of said structural wall to a generally stationary structural member,
       (3) means forming a plurality of spaced apart slots in the structural wall of said rail, and
       (4) a support flange angularly struck from said structural wall,
   (b) a plurality of rungs, each of said rungs being comprised of;
       (1) a plate having a pair of opposed end margins,
       (2) a pair of leg sections extending outwardly from said plate, and
       (3) at least one tab extending outwardly from each of said end margins, said tabs being sized and located to extend through said slots in the structural walls of a pair of spaced apart support rails, said tabs capable of being displaced relative to the location and shape of said slots so that said rungs are removably but captively attached to said support rails, and where said support flanges of a pair of spaced apart rails face each other when said rungs are attached to said pair of spaced apart rails, and said flanges being located so that said leg sections of said rungs are engagable with said support flanges when said rungs are attached to said pair of spaced apart rails.

2. The modular support system of claim 1 further characterized in that said leg sections comprise a pair of spaced apart legs extending outwardly from a pair of spaced apart margins on said plate.

3. The modular support system of claim 2 further characterized in that said plate is also provided with a plurality of spaced apart slots.

4. The modular support system of claim 1 further characterized in that each of said rails comprise an engagement wall extending outwardly from said structural wall in angular relationship thereto, said support system further comprising a cover member, said cover member having a flat plate extending relative to a pair of spaced apart rails and over said engagement walls, and outwardly struck cover flanges on the flat plates of said cover members which extend beyond said engagement walls.

5. The modular support system of claim 4 further characterized in that said engagement walls extend outwardly from opposite sides of said rails with respect to the support flanges on said rails.

6. The modular support system of claim 4 further characterized in that a plurality of removable clamps are provided for engaging said cover members and said rails to retentively but removably hold said cover members on said rails but in spaced apart relationship to said rungs.

7. The modular support system of claim 3 further characterized in that said tabs are capable of being struck angularly to the plate of said rungs to attach said rungs to a pair of spaced apart rails.

8. The modular support system of claim 4 further characterized in that said system comprises a plurality of columns, and a plurality of rail supporting brackets, each of said columns having a plurality of slots, said supporting brackets having tabs capable of being extended into said slots for removably attaching said brackets to said columns, and brackets having surfaces to support a plurality of spaced apart rails.

9. The modular support system of claim 4 further characterized in that said system comprises a plurality of first connecting plates for connecting a plurality of rails in effective end to end relationship, said rails and first connecting plates having aligned fastener receiving apertures to receive fasteners for connecting said rails together.

10. The modular support system of claim 9 further characterized in that said connecting plates connect said rails in generally longitudinal alignment.

11. The modular support system of claim 9 further characterized in that said system comprises a plurality of second connecting plates having a first structure wall and a second structure wall angulated with respect to said first structure wall at about a 90° angle for connecting a pair of rails in generally perpendicular relationship, said second connecting plates having fastener receive apertures aligned with the apertures in said rails to receive fasteners.

12. The modular support system of claim 11 further characterized in that said system comprises a plurality of third connecting plates, each of said third connecting plates having a first structural wall and a second structural wall angulated with respect to said first structural wall at an angle greater than about 90°, each of the structural walls of said third connecting plates having sets of fastener receiving apertures near the ends thereof and capable of being aligned with the sets of apertures at the ends of each of said rails for receiving fasteners and connecting said rails in an angulated relationship.

13. The modular support system of claim 12 further characterized in that said system is adapted for the support of cables and conduit and the like.

14. A support system formed of a plurality of modular components for assembly and disassembly at an on-site location, said support system comprising:
 (a) a plurality of support rails, each of said support rails being comprised of:
  (1) a structural wall,
  (2) means associated with said structural wall for connection of said structural wall to a generally stationary structural member,
  (3) means forming a plurality of spaced apart slots in the structural walls of said rails, and
  (4) a support flange angularly struck from said structural wall;
 (b) a plurality of rungs capable of being connected to a pair of spaced apart rails to form a first substructure having said rails connected by a plurality of said spaced apart rungs, each of said rungs being comprised of:
  (1) a plate having a pair of opposed end margins,
  (2) a pair of leg sections extending outwardly from said plate, and
  (3) at least one tab extending outwardly from each of said end margins, said tabs being sized and located to extend through said slots in the structural walls of a pair of spaced apart support rails, said tabs capable of being displaced relative to the location and shape of said slots so that said rungs are removably but captively attached to said support rails, and where said support flanges of a pair of spaced apart rails face each other when said rungs are attached to said pair of spaced apart rails, and said flanges being located so that said leg sections of said rungs are engagable with said support flanges when said rungs are attachable to said pair of spaced apart rails,
 (c) a plurality of first columns capable of being supported in a generally upright position,
 (d) a plurality of rail supporting brackets,
 (e) cooperating locking means on said brackets and said columns for securing said brackets to said columns in a generally secured position so that said supporting rails may be retained on said rail supporting brackets,
 (f) cooperating locking means on said rungs and brackets for releasably attaching said rungs to said rail supporting brackets,
 (g) a plurality of first connecting plates for use with said rails,
 (h) another cooperating locking means on said rails and first connecting plates for releasably attaching said rails together in an effective end-to-end relationship, and
 (i) a plurality of cover plates for removable disposition over said rails connected by said rungs to form platforms therefrom.

15. The modular support system of claim 14 further characterized in that said first columns can be connected together, and said rail supporting brackets can be removably attached to each of said connected first columns so that said brackets extend outwardly in opposite directions.

* * * * *